United States Patent [19]

Callahan et al.

[11] Patent Number: 5,107,440

[45] Date of Patent: Apr. 21, 1992

[54] ELECTRICAL LOAD MANAGEMENT WITH AUTOGENICALLY TRANSMITTED STATUS DATA

[75] Inventors: Robert E. Callahan, Scituate; Mervyn J. McKee, Plymouth; Craig H. Rosenquist, Scituate, all of Mass.

[73] Assignee: Pacific Scientific Company, Weymouth, Mass.

[21] Appl. No.: 578,838

[22] Filed: Sep. 6, 1990

Related U.S. Application Data

[63] Continuation-in-part of Ser. No. 565,309, Aug. 9, 1990.

[51] Int. Cl.$^5$ .................... G06F 15/56; G08B 23/00
[52] U.S. Cl. .................... 364/492; 340/870.02; 364/483
[58] Field of Search ............ 364/480, 481, 483, 492, 364/493, 514, 464.04; 340/870.02, 870.03, 637, 638; 324/103 R, 116

[56] References Cited

U.S. PATENT DOCUMENTS

| | | | |
|---|---|---|---|
| 4,023,043 | 5/1977 | Stevenson | 364/493 |
| 4,291,375 | 9/1981 | Wolf | 364/464.04 |
| 4,357,665 | 11/1982 | Korff | 364/492 |
| 4,360,881 | 11/1982 | Martinson | 364/493 |
| 4,388,690 | 6/1983 | Lumsden | 364/493 |
| 4,389,577 | 6/1983 | Anderson et al. | 364/493 |
| 4,454,509 | 6/1984 | Buennagel et al. | 364/492 |
| 4,467,314 | 8/1984 | Weikel et al. | 364/492 |
| 4,511,979 | 4/1985 | Amirante | 364/492 |
| 4,589,075 | 5/1986 | Buennagel | 364/492 |
| 4,656,593 | 4/1987 | Gleba et al. | 364/492 |
| 4,694,192 | 9/1987 | Payne et al. | 364/492 |
| 4,757,456 | 7/1988 | Benghiat | 364/464.04 |
| 4,777,607 | 10/1988 | Maury et al. | 364/492 |
| 4,803,632 | 2/1989 | Frew et al. | 364/464.04 |
| 4,819,180 | 4/1989 | Hedman et al. | 364/492 |
| 4,964,058 | 10/1990 | Brown, Jr. | 364/492 |

Primary Examiner—Kevin J. Teska
Attorney, Agent, or Firm—Stanger Michaelson Spivak & Wallace

[57] ABSTRACT

To allow a tester to test whether a switching arrangement near a customer's premises has connected and reconnected loads according to load management command signals from a central utility transmitter, a switch autogenically transmits, over and over, status signals indicating the status of the contacts in the switching arrangement.

9 Claims, 3 Drawing Sheets

ELECTRICAL LOAD MANAGEMENT WITH AUTOGENICALLY TRANSMITTED STATUS DATA

RELATED APPLICATIONS

This is a continuation-in-part of Application Ser. No. 07/565,309 filed Aug. 9, 1990 entitled Electrical Load Management with Continuously Transmitted Status Data in the name of R. Callahan et al.

BACKGROUND OF THE INVENTION

This invention relates to electrical utility load management, and particularly to methods and means for displaying the status of a load management switch associated with a customer location.

In a load management system for a utility, a central station monitors the use of electrical power and responds to peak demand periods by transmitting control commands to a switching arrangement (or switch) that temporarily removes power from one or more of several selected customer loads.

These systems use various means to test the operation, such as the status, of the switching arrangements. In one such system, the switch contains a transmitter which transmits information concerning operation of the switch in response to an interrogating signal transmitted by a hand held tester. The tester then displays or records the information. Such an arrangement requires the tester to transmit an interrogating signal and the switch and tester to perform a "handshake" operation. These may itself become sources of error.

OBJECTS AND SUMMARY OF THE INVENTION

An object of the invention is to improve load management means and methods.

Another object is the avoid problems of pervious methods and means.

According to a feature of the invention these objects are attained in whole or in part by having the switch transmit the desired operating information autogenically and repetitiously. This eliminates the need for an interrogating transmitter in the tester and for the handshake operation.

These and other features of the invention are pointed out in the claims. Other objects and advantages of the invention will become evident from the following detailed description when read in light of the accompanying drawings

DETAILED DESCRIPTION OF PREFERRED EMBODIMENTS

Figure 1:
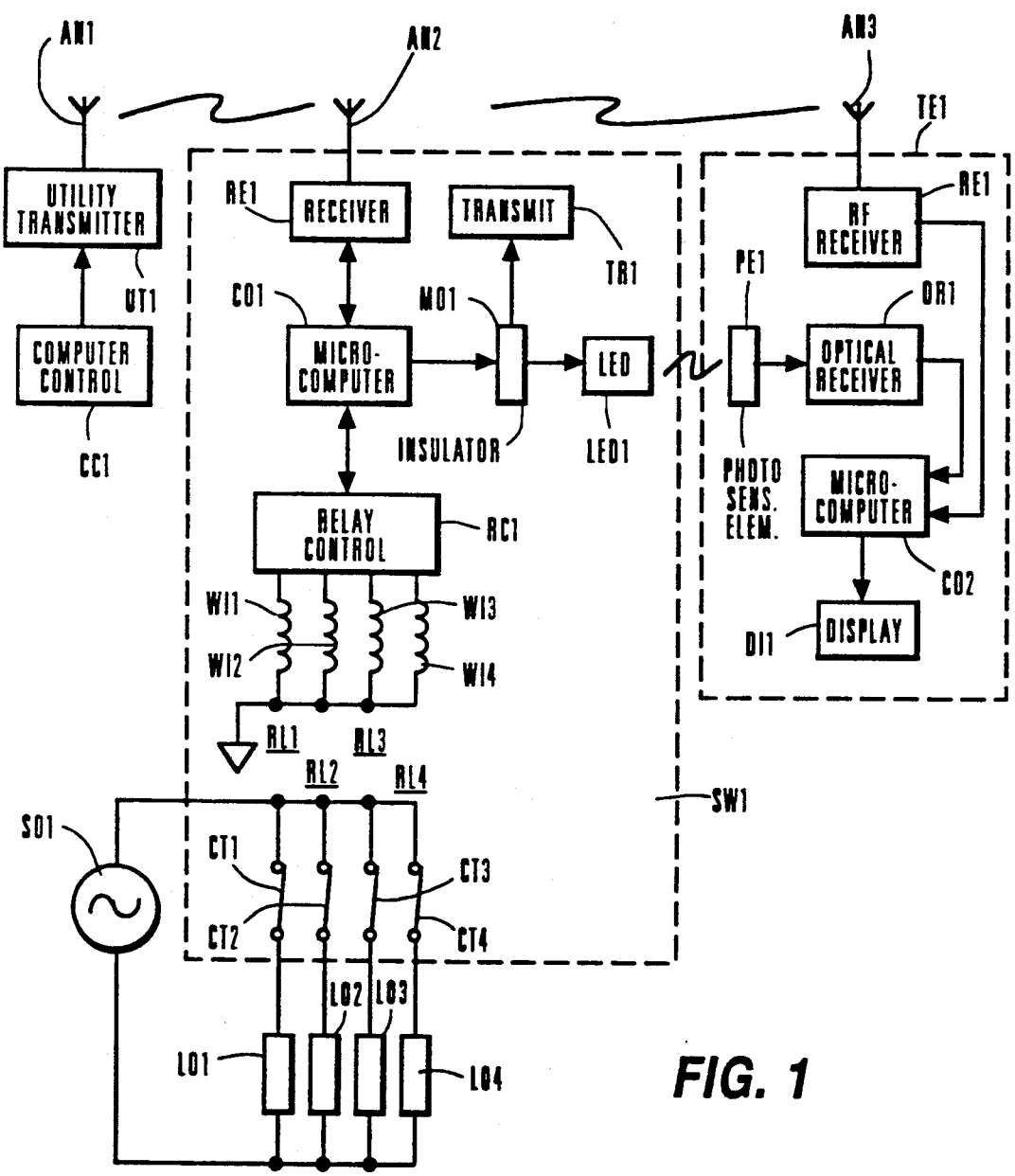
FIG. 1 is a schematic diagram of a system embodying features of the invention.

In FIG. 1, a centrally located utility transmitter UT1 under the control of a computer control CC1 transmits load management command signals to a switching arrangement or switch SW1 to remove a selected one or more of several loads L01, L02, L03, and L04 to which the utility supplies power from a source S01. A tester TE1 receives and displays status information concerning the load management command signals from the switch SW1 and displays or records them to test the operation of the switch.

The utility transmitter UT1 transmits its load management command signals in coded form via an antenna AN1. The coded signals specify which of the loads L01, L02, L03, or L04 the switch SW1 is to remove. The coded signals may also indicate the time period during which the selected load is to remain-off.

In the switch SW1, a receiver RE1 receives the load management command signals from the utility transmitter UT1 via an antenna AN2 and stores them in a microcomputer C01. The latter accesses a relay control RC1 which energizes selected ones of the windings WI1, WI2, WI3, and WI4 of relays RL1, RL2, RL3, and RL4 with normally closed relay contacts CT1, CT2, CT3, and CT4. The microcomputer C01 also instructs a modulator M01 continuously to modulate the light output of an LED (light emitting diode) LED1 with coded signals indicating the status of the relays RL1, RL2, RL3, and RL4 and other information concerning the operation of the switch SW1, for example the recent history of the responses to load management command signals. For the continuous modulation, the information is repeated over and over.

The microcomputer C01 also causes the modulator M01 to modulate the RF transmitter TR1 and continuously to transmit the same coded information as the light emitting diode LED1. Again here the information is repeated over and over.

In the tester TE1 an RF receiver RE2 receives the data from the transmitter TR1 in the switch SW1 and enters it in a microcomputer C02. The latter then records the information and displays it in a display DI1. A photosensitive element PE1 senses the output of the light emitting diode LED1 and applies it to an optical receiver OR1. The latter applies the coded data from the photosensitive element PE1 to the microcomputer C02. The microcomputer C02 decodes the data and a display DI1 displays the information.

Figure 2:
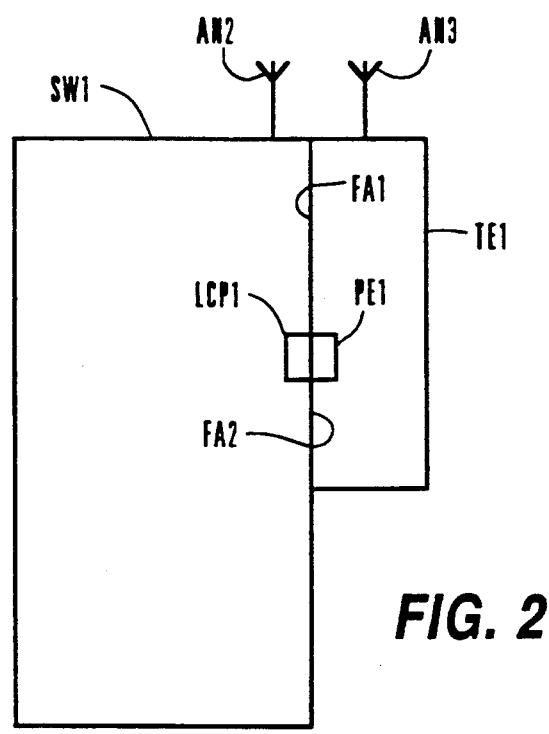
FIG. 2 is a schematic view of the manner in which the tester tests the switch according to the invention.

FIG. 2 illustrates the manner in which a test person holds the tester TE1 against the switch SW1 to perform the test of the switch. Here, a face FA1 of the tester TE1 lies temporarily against a face FA2 of the switch. In this position the antenna AN2 of the switch SW1 lies next to the antenna AN3 of the tester TE1 while the light emitting diode LED1 of the switch sits opposite the photosensitive element PE1. When the test is completed the tester TE1 is removed from this position and carried elsewhere for additional tests.

In operation, during normal power drain, the switch SW1 keeps relays RL1, RL2, RL3, and RL4 in their normally unenergized condition and allows the source S01 to supply power to the loads L01, L02, L03, and L04. As long as the switch SW1 is operational the microprocessor C01 also instructs the modulator M01 continuously to modulate the transmitter TR1 and the light emitting diode LED1 with coded status signals which are repeated over and over again. The transmitter TR1 and the light emitting diode LED1 continuously and repeatedly transmit the coded status signals.

During a period of peak power usage the utility wishes to remove as much excess load from the network as possible to prevent power brownouts. For this purpose the computer CC1 causes the transmitter UT1 to transmit coded load management command signals to disconnect one or more of the loads L01, L02, L03, or L04, for example the loads L02 and L03, via the antenna AN1. The antenna AN2 and the receiver RE1 in the switch SW1 receive the signals. The microcomputer C01 stores the coded load management command signals and causes the relay control RC1 to energize the windings WI2 and WI3 of relays RL2 and RL3. This opens the contact CT2 and CT3 to disconnect the loads L02 and L03.

At this time the microcomputer C01 adds coded signals indicating the disconnect conditions of the relays RL2 and RL3 and the time of their disconnect to its memory and changes the instructions to the modulator M01. The computer now adds the disconnect condition and time to the coded information that it feeds to the modulator M01. The latter then modulates the transmitter TR1 and light emitting diode LED1 with the revised information and the transmitter and light emitting diode transmit the revised information. The transmission continues regardless of the any sensing done by the tester TE1.

Depending on the capacity of the memory in microcomputer C01, and on the information desired during any test, the microcomputer may also eliminate some of the earlier coded data which it causes the modulator M01 to have the transmitter TR1 and light emitting diode LED1 transmit The microcomputer may also erase this outdated information from its memory. The amount of coded data which the switch SW1 transmits to the tester TE1 depends entirely on the needs of the utility during a test. However the information is transmitted continuously by repeating it over and over.

When the peak power period ends, the utility uses the computer CC1 and the transmitter UT1 to transmit load management command signals to the switch SW1 and allow re-connection of loads L02 and L03. The receiver RE1 receives the load management command signals and enters them in the computer C01. The latter deenergizes windings WI2 and WI3 in relays RL2 and RL3. This closes contacts CT2 and CT3, thereby allowing current flow to the loads L02 and L03.

The computer C01 also stores the most recent change in its memory and causes the modulator M01 to make the transmitter TR1 and the light emitting diode LED1 to change the coded data. The newly transmitted data includes the newest change in information. The computer C01 may also delete some of the outdated information previously transmitted as required by the utility. Again the switch transmits all the information continuously by repeating it over and over.

With every change in the status of the switch SW1, the computer C01 enters the new status into its memory and into the information stream being transmitted. Data may be deleted as needed or required.

The data most often needed is that showing the open or closed condition of the relays RL1, RL2, RL3, and RL4 or contacts CT1, CT2, CT3, and CT4. This status data is an example of the data which may always be included in data stream transmitted by the switch. According to one embodiment of the invention, it is the only data transmitted.

The tester TE1 is a portable device which a test person may carry from location to location to perform the needed test. To execute a test, the tester TE1 is placed against the switch SW1 as shown in FIG. 2. The tester then receives the coded status data being transmitted through the antenna AN3 and the receiver RE3 as well as the photosensitive element PE1. The optical receiver OR1 and receiver RE1 enter the coded status data in the microcomputer C02. The latter then places the formation in the display for the test person to see.

According to another embodiment of the invention, the switch SW1 omits the light emitting diode LED1 while retaining the transmitter TR1. According to another embodiment of the invention, the switch SW1 omits the transmitter TR1 while retaining the light emitting diode LED1. Similarly, the tester may omit either the receiver OR2 or the photosensitive element PE1 and optical receiver OR1.

During any test the tester TE1 is placed against the switch SW1. Thus the amount of power needed to transmit the information with the transmitter TR1 is extremely small, only enough to carry a few inches or feet.

The tester TE1 need not be brought into contact with the switch SW1 as shown in FIG. 2. Even with only small power outputs from the transmitter TR1, holding the tester a few inches or feet from the switch SW1 allows the tester to perform its test function. Also, the tester TE1 may be held a distance from the light emitting diode LED1 for the tester to sense its output. The absence of the need for the tester to transmit an interrogating signal and perform a handshaking operation with the switch frees the tester to be placed anywhere within the range of the output of the LED LED1.

Figure 3:
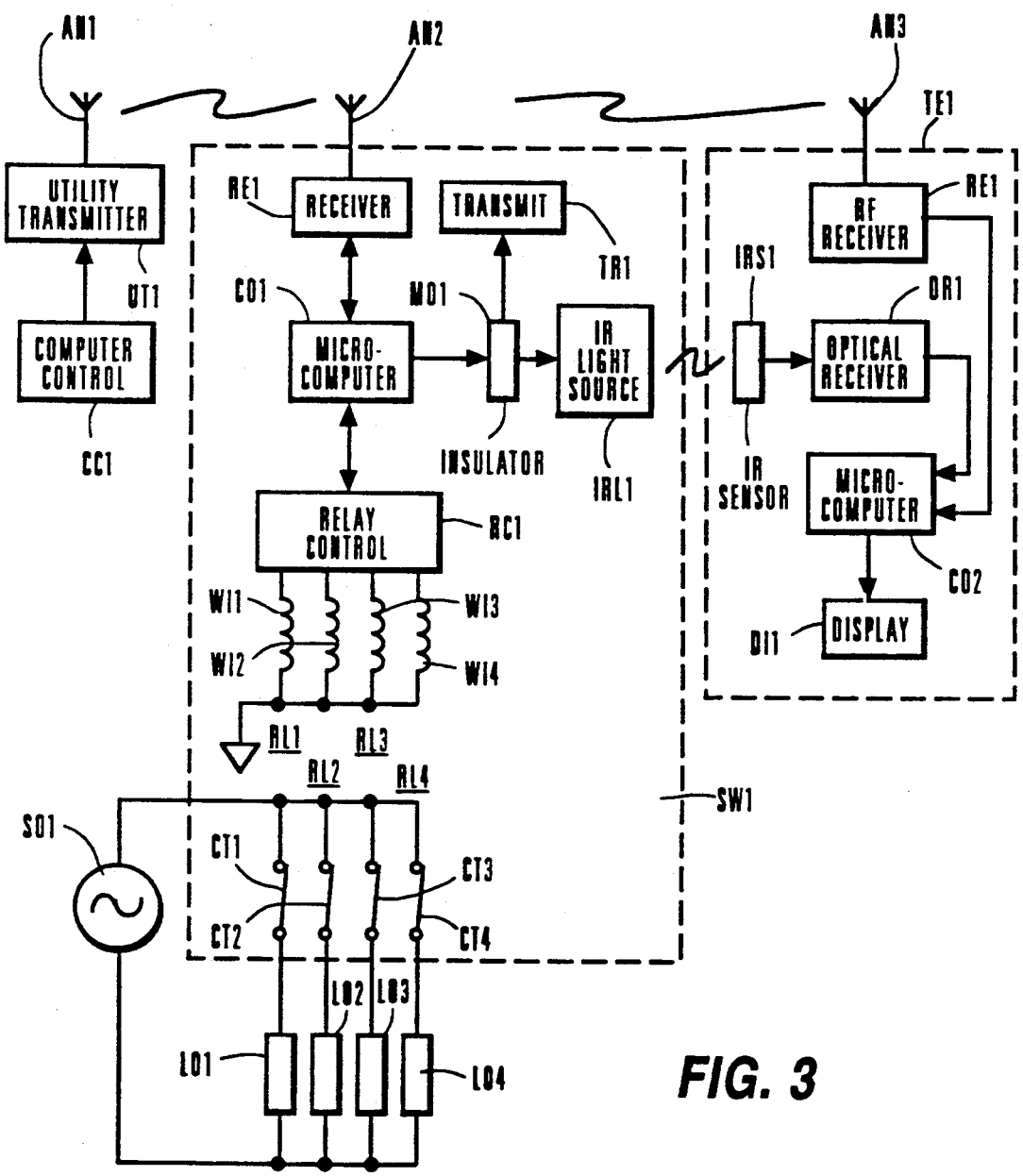
FIG. 3 is a schematic diagram of another system embodying features of the invention.

Another embodiment of the invention appears in FIG. 3. Here, an infra-red light source IRL1 replaces the light emitting diode LED1, and an infra-red sensor IRS1 replaces the photosensitive element PE1. The optical receiver OR responds to the sensor IRS1. In this embodiment, infra-red light source IRL1 is arranged to transmit the infra-red light over distances up to ten feet and more. Thus the tester TE1 may receive the signal from the switch SW1 at distances of up to ten feet. There is no need to place the tester TE1 directly adjacent the switch to receive the desired information as shown in FIG. 2.

Other embodiments of the invention eliminate the transmitter TR1 and the receiver RE2 and operate entirely on an optical basis. One embodiment uses the light emitting diode LED1 an the photosensitive element PE1 without the transmitter TR1 and the receiver RE2 Another embodiment uses the infra-red light source IRL1 and the infra-red sensor IRS1 without the transmitter TR1 and the receiver RE2. In yet another embodiment the optical elements LED1, PE1, OR, IRL1, and IRS1 are eliminated and only the RF transmitter TR1 and RF receiver RE2 communicate between the switch SW1 and the tester TE1.

Still another embodiment of the invention uses any of the aforementioned circuit and transmission arrangements. Here, the microcomputer C01 controls the modulator M01 so that the latter turns on the transmitter TR1, and/or the diode LED1 or the source IRL1 for data transmission in bursts. That is, the transmitting devices TR1 and/or LED1 or IRL1 are turned on once every n seconds, for example 5 seconds or 20 seconds, to transmit the desired information. The transmission of the information may take a fraction of a second. The microcomputer C01 then ends transmission for the remainder of n seconds, i.e. 5 seconds or 20 seconds, and then restarts transmission. This continues indefinitely or until loss of power at the switch SW1.

This burst transmission is in contrast with the previously described full time transmission where there is substantially no delay between repetitions of transmission. Both the burst transmission and the full time transmission may be regarded as continuous.

According to one embodiment of the invention, the microcomputer C01 and relay control RC1 cause the relays RL1 to RL4 to open for predetermined fixed periods when the receiver RE1 receives load management disconnect signals from the utility transmitter UT1. The microcomputer C01 then counts the number of relay operations and causes the modulator M01 to actuate transmission of the number of relay operations over a given period The transmission of information from the from the switch SW1 is autogenic, i.e. actuated entirely from within the switch and requiring no outside prompting from the tester TE1, and continuous in the sense of transmitting the information repeatedly on a continuing basis, either with substantially no delays between transmissions (full time transmission) or on the basis of once every n seconds (burst transmission). In both cases the information is transmitted continuously as long as power exists to energize the switch SW1.

The invention eliminates the need for a transmitter to send an interrogating signal in the hand held tester and avoids a handshaking operation. According to an embodiment of the invention, the microcomputer C01 contains a non-volatile memory for the data to be transmitted. In this way the data remains in store even if the switch loses power.

According to another embodiment of the invention, an ultrasonic transmitter replaces the light emitting diode LED1 or the infra-red light source IRL, and an ultrasonic sensor replaces the photosensitive element PE1 or the infra-red sensor IRS1.

While embodiments of the invention have been described in detail, it will be evident to those skilled in the art that the invention may be embodied otherwise without departing from its spirit and scope.

What is claimed is:

1. For controlling a plurality of electrical loads, an electrical load management system comprising:
   utility control means for transmitting load management signals to control the loads;
   load management switch means responsive to the control means and associated with each of the loads for responding to the load management signals from said utility control means and for regulation operation of the loads;
   portable test means for receiving data and visually displaying the data; and
   said load management switch means having storage means for storing the data concerning the load management signals and having transmitting means coupled to said storage means for autogenically transmitting the stored data so that when said portable test means is within range of the transmitting means, said portable test means can receive data transmitted by said transmitting means.

2. A system as in claim 1, wherein said transmitting means transmits the stored data repeatedly.

3. A system as in claim 1, wherein said transmitting means transmits the stored data repeatedly on a continuing endless basis.

4. A system as in claim 1, wherein said transmitting means transmits the stored data repeatedly in bursts with delays between repetitions.

5. A system as in claim 1, wherein said transmitting means transmits the stored data repeatedly with substantially no delay between the repeated data.

6. For controlling a plurality of electrical loads in response to load management signals from a control center, an electrical load management switch comprising:
   load management control means associated with each of the loads for responding to the load management signals from said control center and for regulating operation of the loads;
   storage means for storing the data concerning the load management signals; and
   transmitting means for autogenically and continuously transmitting the stored data so that the transmitted data can be received by a portable tester.

7. A switch as in claim 6, wherein said transmitting means transmits the stored data repeatedly.

8. A switch as in claim 6, wherein said transmitting means transmits the stored data continuously and repeatedly in bursts with delays between repetitions.

9. A switch as in claim 6, wherein said transmitting means transmits the stored data continuously and repeatedly with substantially no delay between the repeated data.

* * * * *